June 8, 1954

A. BECKER 2,680,413

LOAD-STABILIZING LINKAGE FOR METALLIC CARS

Filed March 13, 1951

INVENTOR
*Anton Becker*

BY

ATTORNEY

Patented June 8, 1954

2,680,413

UNITED STATES PATENT OFFICE 2,680,413

LOAD-STABILIZING LINKAGE FOR METALLIC CARS

Anton Becker, Columbus, Ohio

Application March 13, 1951, Serial No. 215,321

3 Claims. (Cl. 105—200)

The present invention relates to railway vehicles, and more particularly to an improved linkage for connecting the bodies of railway vehicles with their associated wheel trucks, and in a manner to provide an even distribution and stabilization of the load of the body and its contents upon the component parts of the wheel trucks during all conditions of vehicle operation.

The primary object of the present invention is to provide a mechanically efficient, yet structurally simple connecting linkage between the bodies and wheel trucks of railway vehicles by which normal shifting of the load factor of the vehicle body, particularly during passage of the vehicle around curves, is prevented, and wherein oscillatory movement or tipping of the vehicle body relative to the wheel truck members is prevented, to thus minimize low-side loads on curves and consequent undesired relatively high friction between the low-side wheel flanges and the rail normally caused by centripetal forces occasioned as the vehicle moves over a curved section of track.

It is another object of the invention to provide a load-stabilizing linkage for railway vehicles which may be readily installed upon new and existing vehicles without major structural modification thereto, and wherein such linkage does not interfere with the assembly or removal of the wheel trucks with respect to the vehicle body.

It is a further object of the invention to provide a linkage of the character described which comprises cooperative sets of brackets and hangers disposed equidistantly on either side of the pivotal connection between the vehicle body and the wheel truck bolster, and wherein the cooperative brackets or hangers are interconnected by means of one or more antifriction rollers which provide for limited relative turning movement between the car body and the truck bolster, but which prevent relative oscillation or tilting movement between such members.

Yet another object is to provide a load-stabilizing linkage which eliminates the need for side compression bearings between the vehicle body and the wheel trucks and which provides for the free suspension of the low side of the vehicle body from the longitudinal center of the vehicle body, with downwardly directed forces applied to the low side of the body being absorbed and stabilized in upward reaction upon the opposite or high side of the body.

For a further and more detailed understanding of the present invention and additional objects and advantages derived therefrom, reference is made to the following description and the accompanying drawing, wherein.

Figure 1:
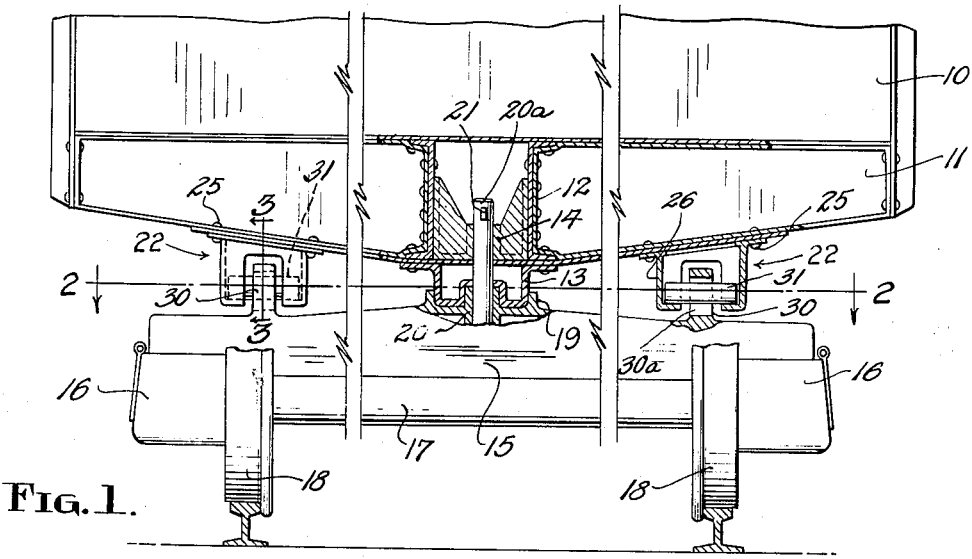
Fig. 1 is a front elevational view of a wheel truck assembly showing my improved load-stabilizing linkage connected between the truck bolster and the body of the vehicle.
Figure 2:
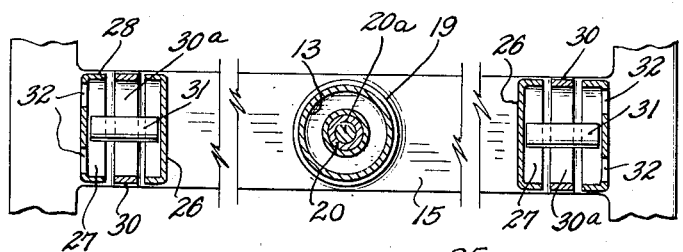
Fig. 2 is a horizontal sectional view taken along a plane indicated by the line 2—2 of Fig. 1.

Referring to the drawings, the numeral 10 designates generally a railway vehicle car body having on its under side a transversely arranged body bolster 11 of box girder cross-sectional configuration tapering downwardly and inwardly toward the center from the respective ends. In the usual manner, the body bolster 11 is provided in its central region with a center brace 12 and a depending body center plate 13. Carried within the center brace 12 in axial alignment with the center plate 13 is a tubular bearing collar 14, having a pin-receiving bore disposed in axial alignment with openings extending through the bottom body plate and the center plate 13.

The numeral 15 designates generally a wheel truck bolster which mounts the journal boxes 16 in which are journaled the respective ends of an axle shaft 17, the shaft 17 carrying a pair of transversely spaced parallel flanged wheels 18. The truck bolster 15 is provided on its central upper edge with a truck center plate 19 and a coaxially arranged vertically and upwardly projecting king pin-receiving sleeve 20. The annular truck center plate 19 is adapted to receive the depending body center plate 13 carried upon the center brace 12. A king pin 20a extends through the bore formed in the tubular bearing sleeve 14, the openings in the body center plate 13, and the sleeve 20 to provide an axis of rotation between the car body and the wheel truck. In the usual manner, a locking key 21 extends diametrically through the upper portion of the king pin 20a, after insertion of the latter through the sleeve 14, to lock the central portion of the truck against vertical displacement with respect to the body bolster 11. The locking key 21 is removable from the shaft 20 for purposes of assembly and disassembly. Also, the bearing surfaces of the center plate 13 and the truck center plate 19 may be separated by means of an annular thrust bearing, not shown, in order to provide an antifriction support between the truck bolster and body bolster to permit free turning movement of the truck relative to the body.

In accordance with the present invention, I provide a load stabilizing linkage between the body and truck bolsters on either side of the pivotal connection between these members. This linkage comprises a pair of depending brackets or hangers 22 which are secured to the body bolster 11 at equal distances outwardly from the king pin connection between the body and car bolsters.

Figure 5:
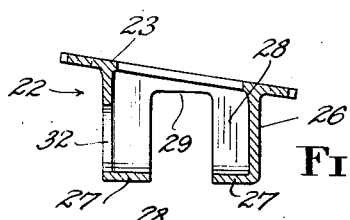
Fig. 5 is a vertical sectional view taken along the line 5—5 of Fig. 4.
Figure 4:
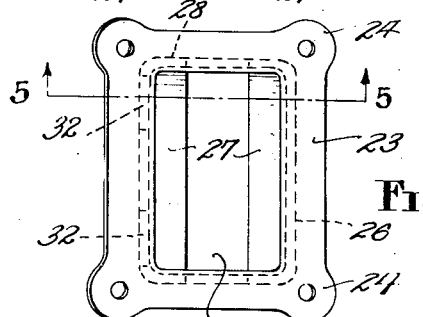
Fig. 4 is a top plan view of the body-carried brackets of the present load-stabilizing linkage.

As shown particularly in Figs. 4 and 5, each bracket 22 comprises a substantially rectangular open frame formed to provide an upper flat attaching web or flange 23 which is formed in its corner regions with rivet-receiving boss formations 24 through which rivets 25 may be passed to secure the bracket to the under side of the body bolster 11, as shown in Fig. 1. The brackets 22 are further formed to provide a pair of relatively spaced and depending side wall flanges 26 which terminate at their lower ends in inwardly turned bottom wall ledges 27. The brackets at either end are provided with U-shaped end wall formations 28 which are recessed to provide a straight channel 29 extending through the brackets 22.

Figure 3:
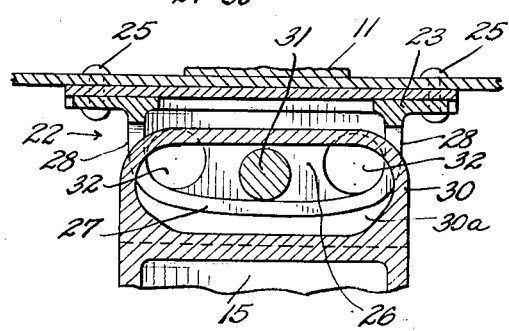
Fig. 3 is a longitudinal vertical sectional view taken along the line 3—3 of Fig. 1.

Projecting upwardly within the channels provided in the brackets 22 are a pair of cooperative slotted bail-like flanges 30 which project vertically upwardly from the truck bolster 15. Each of the flanges 30 is preferably formed integral with the truck bolster, or may, if desired, be integrally secured thereto as by welding or other suitable fastening means. The flanges 30 are formed to provide an elongated slot 30a having straight side walls and rounded end wall surfaces, as shown in detail in Fig. 3. Extending transversely through the slot 30a is an antifriction roller 31 whose outer end portions extend between and ride upon the opposed bottom wall ledge formations 27 formed on each of the brackets 22. As shown in detail in Fig. 3, the bottom wall ledge formations of the brackets 22 provide a slightly arcuate shelf which curves upwardly on either side of its central portion to join with the end wall formations 28. The slight arcuate curvature of the bottom shelf formations 27 results in the self-centering of the rollers 31 with respect to the brackets 22 following longitudinal displacement of the brackets 22 with respect to the flanges 30 during turning movement between the wheel truck and the body.

The outer side wall 26 of each of the brackets 22 is provided in its lower corner regions with circular openings 32 through which the rollers 31 are inserted within, or removed from, the bracket during assembly or disassembly or the removal of the truck.

In operation, the rollers 31 ride on the inwardly turned bottom shelf formations 27 of the brackets 22 slightly below the upper web of the flanges 30. The linkage permits limited turning movement of the truck relative to the vehicle body, during which time the rollers 31 roll longitudinally of the slots 30a formed in the flanges 30. Due to the relatively snug-fitting relationship between the rollers 31, the flanges 30 and the shelf formations 27 of the brackets, the car body is prevented from tilting or oscillating in a vertical plane relative to the truck assembly, and thereby prevents shocks and undue shifting of the load of the car body upon the truck assembly. This is particularly important when considering the normal movement of the car body when rounding a curved section of track. Ordinarily, in the absence of a stabilizing linkage of the character formed in accordance with the present invention, the load comprising the weight of the body and its contents tends to shift to the low side of the truck assembly as the same follows the inclined bank of a curved track section. This overbalance in the load causes an uneven distribution of weight on the low side wheels of the truck assembly with a consequent grinding and frictional dragging of the wheel flanges of the inside or low side wheels. However, in utilizing the present stabilizing linkage, tilting or canting movement of the car body relative to the truck assembly is prevented by upward reaction of the linkage on the high side, with the load being maintained along the central portion of the car body and absorbed through substantially the point of pivotal connection between the car body and the bolsters of the wheel trucks. In this manner, the load of the body and its contents is maintained uniformly along the longitudinal center line and prevented from shifting to either side with respect to the wheel trucks during the rounding of a curved section of track by the vehicle.

In view of the foregoing, it will be seen that the present invention provides a mechanically efficient, yet structurally simple stabilizing linkage for railway vehicles which may be installed and assembled with facility in connection with the present car and wheel truck assemblies now employed in railway vehicles without modification thereto.

I claim:

1. In a railway vehicle having a body and a wheel truck rotatably connected with the body; a load-stabilizing linkage comprising a pair of bifurcated brackets depending from said body on opposite sides of its center line, each of said brackets being formed with a longitudinally extending channel bounded on opposite sides with oppositely disposed shelf-forming webs; a pair of longitudinally and horizontally slotted flanges projecting upwardly from and rigidly secured to said wheel truck and extending within the channels of said brackets; a roller extending transversely through the slot formed in each of said flanges, across the channel of each of said brackets and having its respective end portions rollingly supported on the shelf-forming webs of said brackets, said roller being arranged to permit limited longitudinal movement of said flanges with respect to said brackets but to prevent upward separating movement therebetween, and passage means formed in one side of each of said brackets permitting removal of said roller from the slot of said flange and said bracket, said roller, when removed from said bracket, providing for free vertical separation of said brackets and flanges.

2. In a railway vehicle having a body and a wheel truck rotatably connected with said body for turning movement in a substantially horizontal plane, said truck including a transversely extending bolster; a plurality of bifurcated brackets carried by and depending from said body on opposite sides of the axis of turning movement of said truck, each of said brackets defining a longitudinally disposed, open channel and being provided with opposed, horizontal, shelf-forming webs on either side of the channel thereof, each of said brackets being further formed with an opening in one side thereof; a plurality of longitudinally disposed bail flanges rigidly carried on and extending upwardly from the bolster of said truck on opposite sides of the axis of turning movement of said truck and projecting into the channels of said bracket members, each of said flanges being formed with an elongated, longitudinally and horizontally extending, closed slot, and a cylindrical roller extending through the slot formed in each of said flanges and having its end portions rollingly engaged with the opposite shelf-forming webs of a cooperative bracket, said roller serving to unite each flange with a cooperative bracket to provide for limited relative turning movement between said truck and said body and to prevent relative vertical separation of said body and truck, said roller being removable through the opening formed in the side of said bracket to permit of vertical separation of said body and truck.

3. In combination with a railway vehicle having a body and a relatively rotatable wheel truck including a transverse bolster normally supporting the weight of the body in its central region; a pair of vertically arranged bail members rigidly carried by said bolster and projecting upwardly therefrom on opposite sides of the center of said bolster, each of said bail members being formed with an elongated, longitudinally and horizontally extending slot; a pair of relatively spaced bracket members rigidly connected with said body in depending relation thereto and arranged in the vertical planes of said bail members, each of said bracket members including a pair of transversely spaced vertical webs terminating at their lower ends in inwardly turned, substantially horizontally opposed, shelf-forming flanges, the flanges of said webs being spaced transversely apart and defining a longitudinally extending open channel to receive one of said bail members, at least one of the vertical webs of each of said bracket members being formed with an opening above said flanges; and an elongated anti-friction roller having its end portions rollingly supported on the opposed flanges of each of said bracket members and its intermediate portion extending through the slot formed in a complemental bail member, said roller uniting each of said bracket members with one of said bail members to permit relative turning movement between said truck and body, but to prevent relative vertical movement therebetween, said roller being removable transversely from said bracket member and said bail member by way of the opening formed in the vertical web of said bracket member.

References Cited in the file of this patent

UNITED STATES PATENTS

| Number | Name | Date |
|---|---|---|
| 217,934 | Foss | July 29, 1879 |
| 311,553 | Wilson | Feb. 3, 1885 |
| 1,133,573 | O'Connor | Mar. 30, 1915 |
| 1,814,232 | Sturrock | July 14, 1931 |